United States Patent [19]
Barkan et al.

[11] Patent Number: 5,272,353
[45] Date of Patent: Dec. 21, 1993

[54] RETRO-REFLECTIVE SCANNER WITH RETURN PATH FREE OF COLLECTION OPTICS

[75] Inventors: Edward Barkan, South Setauket; Howard M. Shepard, Great Neck, both of N.Y.

[73] Assignee: Symbol Technologies, Inc., Bohemia, N.Y.

[21] Appl. No.: 901,305

[22] Filed: Jun. 19, 1992

[51] Int. Cl.⁵ .................................................. G06K 7/10
[52] U.S. Cl. .................................... 250/566; 250/235; 235/467

[58] Field of Search ............... 250/234, 235, 236, 566, 250/568; 235/467, 472; 359/213, 214

[56] References Cited

U.S. PATENT DOCUMENTS

| | | | |
|---|---|---|---|
| 4,871,904 | 10/1989 | Metlitski et al. | 235/467 |
| 5,047,617 | 9/1991 | Shepard et al. | 235/467 |
| 5,151,580 | 9/1992 | Metlitsky et al. | 235/467 |

Primary Examiner—David C. Nelms

[57] ABSTRACT

Collection optics are eliminated in the return path of a retro-reflective scanner for reading bar code symbols.

9 Claims, 2 Drawing Sheets

5,272,353

RETRO-REFLECTIVE SCANNER WITH RETURN PATH FREE OF COLLECTION OPTICS

BACKGROUND OF THE INVENTION

1. Field of the Invention

This invention generally relates to a retro-reflective scanner operative for electro-optically reading indicia having parts of different light reflectivity, for example, bar code symbols, and, more particularly, to eliminating collection optical components in the return path along which light reflected off the indicia travels.

2. Description of Related Art

Various optical readers and optical scanners have been developed heretofore to optically read bar code symbols applied to objects in order to identify the object by optically reading the symbol thereon. The bar code symbol itself is a coded pattern comprised of a series of bars of various widths and spaced apart from one another to bound spaces of various widths, the bars and spaces having different light reflecting properties. The readers and scanners electro-optically decoded the coded patterns to multiple digit representations descriptive of the objects. Scanners of this general type have been disclosed, for example, in U.S. Pat. Nos. 4,251,798; 4,360,798; 4,369,361; 4,387,297; 4,593,186; 4,496,831; 4,409,470; 4,460,120; 4,607,156; 4,673,805; 4,736,095; 4,758,717; 4,760,248; 4,806,742; 4,808,804; 4,825,057; 4,816,661; 4,816,660; 4,835,374; 4,845,350; 4,871,904; 4,896,026 and 4,923,281, all of said patents having been assigned to the same assignee as the instant invention and being hereby incorporated herein by reference.

As disclosed in the above-identified patents, a particularly advantageous embodiment of such a scanner resided, inter alia, in emitting a light beam, preferably a laser beam, emitted from a light source, preferably a gas laser or a laser diode, and in directing the laser beam along an outgoing path to a symbol to be read. En route to the symbol, the laser beam was directed to, and reflected off, a light reflector of a scanning component. The scanning component moved the reflector in a cyclical fashion and caused the laser beam to repetitively scan the symbol. The symbol reflected the laser beam incident thereon.

In a retro-reflective scanner, a portion of the incident light reflected off the symbol was collected in a return path by collection optics, and detected by a detector component, e.g. a photodetector, of the scanner having a field of view. The purpose of the collection optics is to increase the amount of light reaching the detector, and to limit the field of view of the detector to minimize the amount of ambient light that reaches the detector. The detected light over the field of view was converted into an electrical signal which, in turn, was decoded by electrical decode circuitry into data descriptive of the symbol for subsequent processing. The cyclically movable reflector swept the laser beam across the symbol and swept the field of view during scanning.

There were several different types of collection optics disclosed in the known retro-reflective scanners. For example, U.S. Pat. No. 4,409,470 disclosed a convex lens in the return path. U.S. Pat. No. 4,816,660 disclosed a concave collecting mirror in the return path. Such optical components occupied space, were required to be accurately positioned, and represented an expense, not only in manufacturing, but in assembly costs—all factors which are desired to be avoided.

SUMMARY OF THE INVENTION

1. Objects of the Invention

It is an object of this invention to eliminate collection optical components in the return path of reflected light in a retro-reflective scanner.

It is another object of this invention to render a retro-reflective scanner more compact in size, and less expensive both in terms of manufacturing and assembly costs.

2. Features of the Invention

In keeping with these objects, and others which will become apparent hereinafter, one feature of this invention resides, briefly stated, in a retro-reflective electro-optical scanner for, and a method of, reading indicia having parts of different light reflectivity. The invention includes means for generating and directing a light beam along an outgoing path, and a reflector mounted in the outgoing path for reflecting the light beam toward the indicia for reflection therefrom.

The invention also includes detector means for detecting light reflected off the indicia over a field of view in a return path free of collection optical components, and for generating an electrical signal representative of the indicia. The reflector is also mounted in the return path for directly receiving the reflected light, and for directly reflecting the reflected light to the detector means. The reflector is moved to simultaneously scan the light beam and the field of view.

In a preferred embodiment, the light beam generating means includes a laser diode having an outlet facing the reflector, and the detector means includes a photodetector having an inlet facing the reflector. The reflector includes a generally planar mirror extending across the outgoing and return paths. The outgoing and return paths intersect at, or are side by side, or adjacent, the reflector.

In accordance with this invention, the elimination of collection optics in the return path renders the scanner smaller in size. The photodetector need not be as finely positioned as in the prior art. Tolerances on aiming the laser diode are also eased. The expenses involved in manufacturing and assembling collection optics are avoided. The scanner can be incorporated in many different configurations, e.g. hand-held or fixed mount.

The novel features which are considered as characteristic of the invention are set forth in particular in the appended claims. The invention itself, however, both as to its construction and its method of operation, together with additional objects and advantages thereof, will be best understood from the following description of specific embodiments when read in connection with the accompanying drawings.

DETAILED DESCRIPTION OF THE PREFERRED EMBODIMENTS

Figure 1:
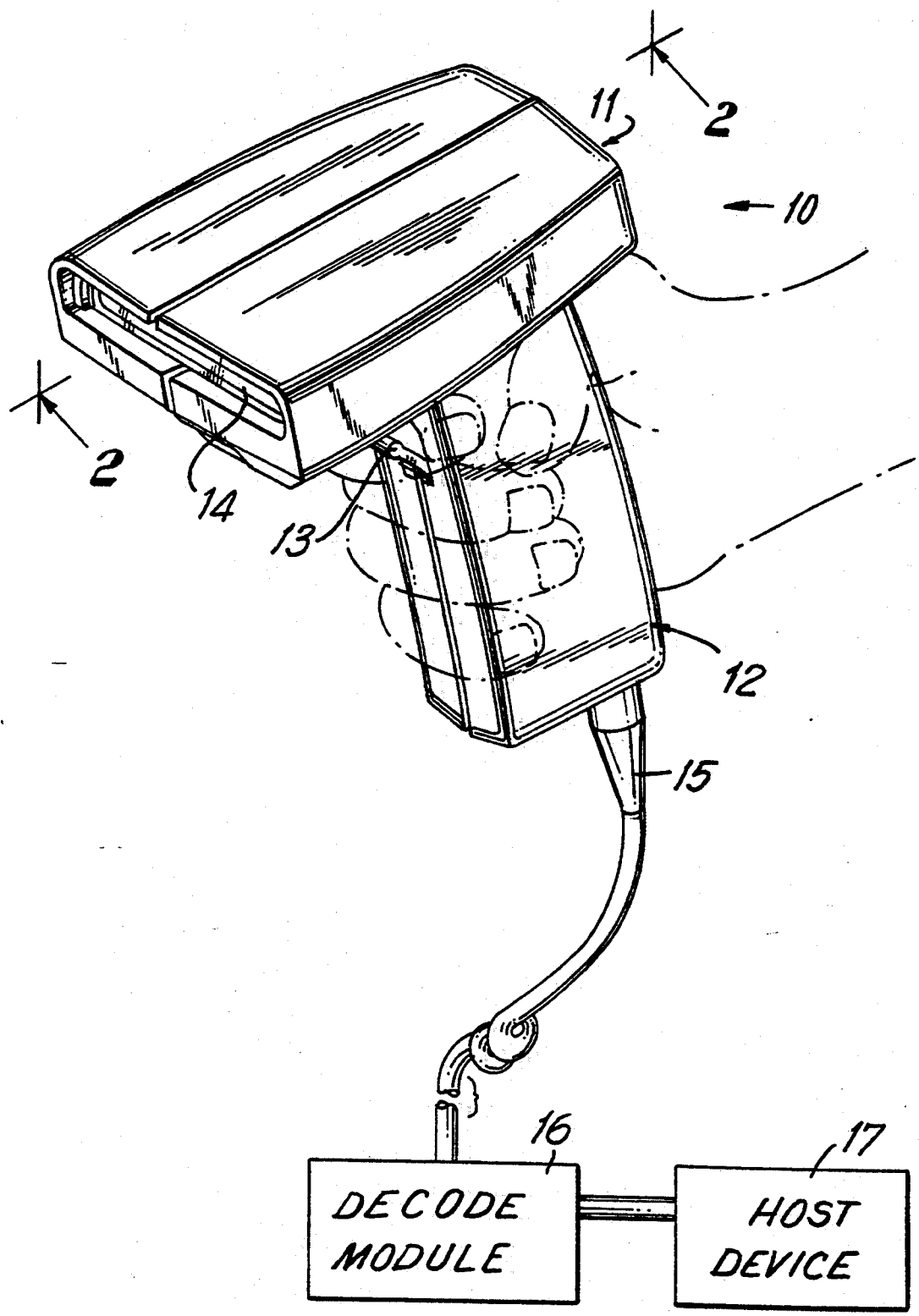
FIG. 1 is a perspective view of a hand-held head of a scanner in accordance with this invention.
Figure 2:
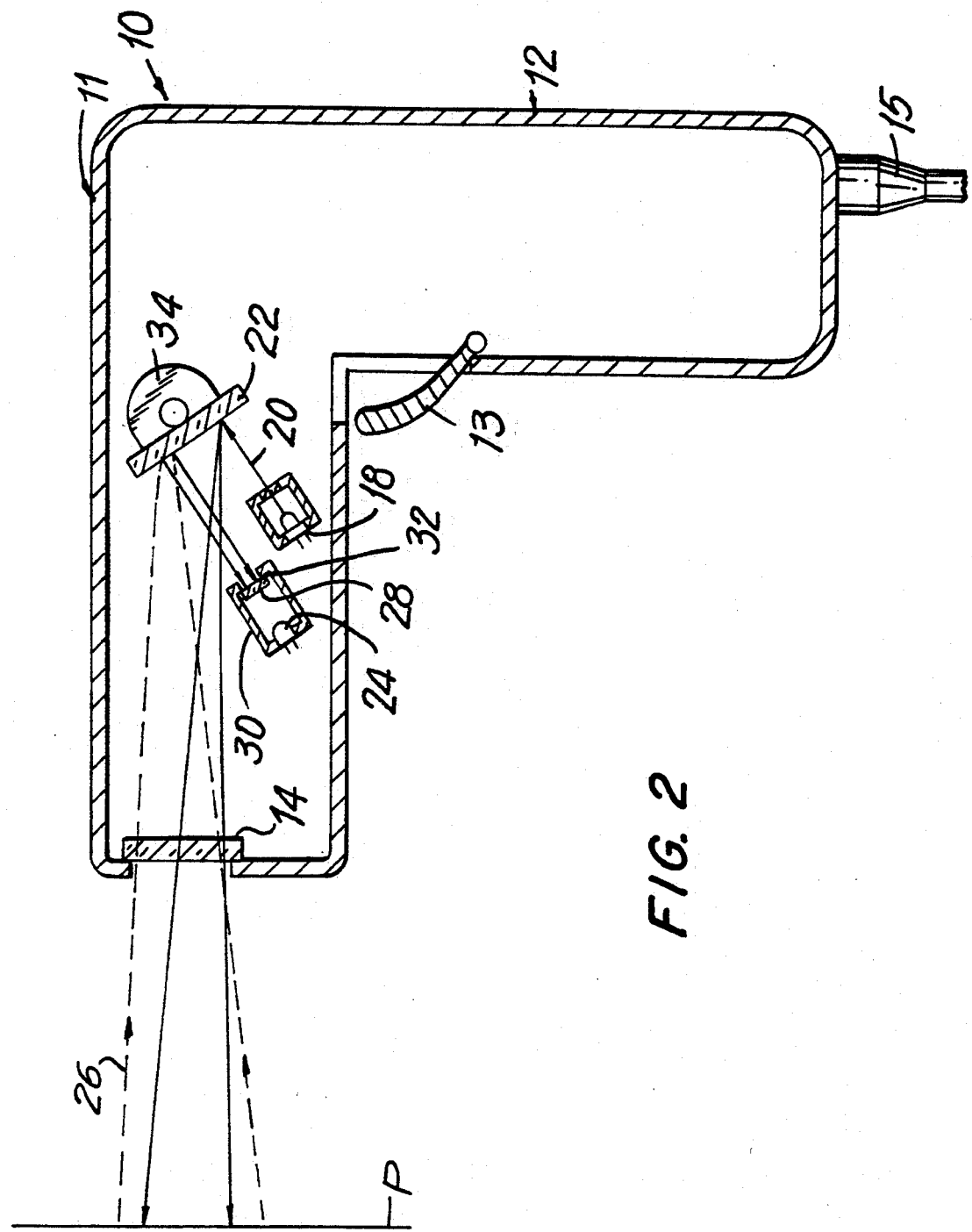
FIG. 2 is a sectional view of the head of FIG. 1 taken on line 2—2 of FIG. 1.

Referring now to the drawings, reference numeral 10 generally identifies a hand-held, gun-shaped, retro-reflective scanner head having a barrel 11 and a handle 12. A manually-operable trigger 13 is situated below the barrel 11 on an upper, forwardly-facing part of the handle 12. As known from the above-identified patents incorporated by reference herein, a light source component, typically, but not necessarily, a laser diode 18 (see FIG. 2), is mounted inside the head 10. The light source 18 emits a light beam along an outgoing path 20 to a generally planar reflector 22 which, in turn, reflects the light beam outwardly through a window 14 that faces indicia, e.g. bar code symbols, located at plane P, to be read.

Also mounted within the head is a photodetector component, e.g. a photodiode 24, having a field of view, and operative for detecting reflected light returning through the window 14 along a return path 26 (shown in dashed lines), from the symbol. An optional optical filter 28 is mounted in front of the photodiode. The filter 28 and the photodiode 24 are mounted in a tube 30 having an aperture stop 32 through which the reflected light passes en route to the photodiode. The reflected light first impinges on the reflector 22 which, in turn, reflects the impinging light directly to the photodiode.

The aperture stop 32 is optional and is used to limit the field of view of the photodiode to a relatively small area around the laser spot formed by the light beam on the symbol. This helps to reject ambient light from reaching the photodiode. In moderate lighting conditions, the aperture stop can be eliminated.

A scanning component 34 is mounted within the head 10, and is operative for simultaneously scanning the symbol and the field of view of the photodetector. The reflector 22 is mounted on and driven by an electrically-operated drive, either in alternate circumferential directions, or rotated completely around an axis of rotation.

The photodetector generates an electrical analog signal indicative of the variable intensity of the reflected light. This analog signal is converted into a digital signal by an analog-to-digital converter circuit. This digital signal is conducted along an electrical cable 15 to a decode module 16 located exteriorly of the head 10. The decode module 16 decodes the digital signal into data descriptive of the symbol. The cable 15 is eliminated in case the decode module 16 is located within the head 10. An external host device 17, usually a computer, serves mainly as a data store in which the data generated by the decode module 16 is stored for subsequent processing.

In use, each time a user wishes to have a symbol read, the user aims the head at the symbol and pulls the trigger 13 to initiate reading of the symbol. The symbol is repetitively scanned a plurality of times per second, e.g. 40 times per second. As soon as the symbol has been successfully decoded and read, the scanning action is automatically terminated, thereby enabling the scanner to be directed to the next symbol to be read in its respective turn.

The scanner need not comprise a hand-held head, but could be a fixed mount in which no trigger is used to initiate reading. A fixed mount scanner may run continuously or be controlled by an external signal to initiate reading.

In accordance with this invention, no collection optics, such as lenses or concave collecting mirrors, are located in the return path. The same reflector 22 is located in both the outgoing path 20 and the return path 26. The field of view of the photodetector is limited not optically as in the case of retro-reflective systems having collection optics, but mechanically by the dimensions of the aperture stop 32 of the tube 30. The lack of collection optics causes the electrical signal generated by the detector to be smaller in magnitude and, of course, the ambient light level is larger. However, this weaker signal can be compensated for by the analog-to-digital converter circuit mentioned above and assisted, if necessary, by a low-noise amplifier.

It will be understood that each of the elements described above, or two or more together, also may find a useful application in other types of constructions differing from the types described above.

While the invention has been illustrated and described as embodied in a retro-reflective scanner with return path free of collection optics, it is not intended to be limited to the details shown, since various modifications and structural changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the following claims.

What is claimed as new and desired to be protected by Letters Patent is set forth in the appended claims.

I claim:

1. A retro-reflective electro-optical scanner for reading indicia having parts of different light reflectivity, comprising:
    (a) means for generating and directing a light beam along an outgoing path;
    (b) a reflector mounted in the outgoing path for reflecting the light beam toward the indicia for reflection therefrom;
    (c) detector means for detecting light reflected off the indicia over a field of view in a return path free of any means for optically focusing and optically limiting said field of view, and for generating an electrical signal representative of the indicia;
    (d) said reflector also being mounted in the return path for directly receiving the reflected light from the indicia and for directly reflecting the reflected light to the detector means; and
    (e) means for moving the reflector to simultaneously scan the light beam and the field of view.

2. The retro-reflective scanner according to claim 1, wherein the light beam generating means includes a laser diode having an outlet facing the reflector means, and wherein the detector means includes a photodetector having an inlet facing the reflector means.

3. The retro-reflective scanner according to claim 1, wherein the reflector includes a generally planar mirror extending across the outgoing and return paths.

4. The retro-reflective scanner according to claim 1, wherein the moving means reciprocally oscillates the reflector.

5. The retro-reflective scanner according to claim 1, wherein the outgoing and return paths intersect adjacent to the reflector.

6. A method of electro-optically reading indicia having parts of different light reflectivity, comprising the steps of:
    (a) generating and directing a light beam along an outgoing path;
    (b) reflecting the light beam toward the indicia for reflection therefrom by mounting a reflector in the outgoing path;

(c) detecting light reflected off the indicia by a photodetector over a field of view in a return path free of any means for optically focusing and optically limiting said field of view, and for generating an electrical signal representative of the indicia;

(d) said reflector also being mounted in the return path for directly receiving the reflected light from the indicia, and for directly reflecting the reflected light to the detector means; and (e) means for moving the reflector to simultaneously scan the light beam and the field of view.

7. The method according to claim 6, wherein the directing step is performed by pointing a laser diode at the reflector, and wherein the detecting step is performed by pointing the photodetector at the reflector.

8. The method according to claim 6, wherein the moving step is performed by reciprocally oscillating the reflector.

9. A retro-reflective electro-optical multi-component scanner for reading indicia having parts of different light reflectivity, comprising:

(a) a laser in the scanner for emitting a laser beam along an outgoing path;

(b) a generally planar reflector mounted in the outgoing path for directly receiving and reflecting the laser beam outwardly of the scanner toward the indicia for reflection therefrom;

(c) a detector in the scanner for detecting laser light reflected off the indicia over a field of view in a return path free of any means for optically focusing and optically limiting said field of view, and for generating an electrical signal representative of the indicia;

(d) said generally planar reflector also being mounted int he return path for directly receiving the reflected laser light from the indicia, and for directly reflecting the reflected laser light to the detector; and (e) means for moving the generally planar reflector to simultaneously scan the laser beam and the field of view, said generally planar reflector being the sole movable component int he scanner.

* * * * *